(12) United States Patent
Gierer

(10) Patent No.: US 6,872,165 B2
(45) Date of Patent: Mar. 29, 2005

(54) PARKING BRAKE SYSTEM FOR A GEARBOX OF A MOTOR VEHICLE

(75) Inventor: Georg Gierer, Kressbronn (DE)

(73) Assignee: ZF Freidrichshafen AG, Friedrichshafen (DE)

( * ) Notice: Subject to any disclaimer, the term of this patent is extended or adjusted under 35 U.S.C. 154(b) by 0 days.

(21) Appl. No.: 10/239,105

(22) PCT Filed: Mar. 24, 2001

(86) PCT No.: PCT/EP01/03377
§ 371 (c)(1),
(2), (4) Date: Sep. 19, 2002

(87) PCT Pub. No.: WO01/75336
PCT Pub. Date: Oct. 11, 2001

(65) Prior Publication Data
US 2003/0047413 A1 Mar. 13, 2003

(30) Foreign Application Priority Data
Mar. 30, 2000 (DE) ......................... 100 15 781

(51) Int. Cl.⁷ ............................................. B60K 41/26
(52) U.S. Cl. ........................... 477/92; 477/96; 477/184; 477/199; 477/200; 477/202; 477/208; 192/219; 192/219.4; 192/219.6; 188/34; 188/112 R; 188/356; 188/151 R; 188/105; 188/106 R; 188/106 P
(58) Field of Search ................................ 477/184, 199, 477/200, 202, 208, 92, 96; 192/219, 219.4, 219.5, 219.6, 219.7; 188/34, 112 R, 356, 151 R, 105, 106 R, 106 P

(56) References Cited
U.S. PATENT DOCUMENTS 2,963,115 A   12/1960   Péras .......................... 188/69
3,796,138 A * 3/1974   Doyle et al. .................. 92/63

(Continued)

FOREIGN PATENT DOCUMENTS

| DE | 41 27 991 A1 | 2/1993 | ........... B60K/20/02 |
| DE | 43 17 257 C1 | 5/1994 | ........... B60K/20/02 |
| DE | 43 22 523 A1 | 1/1995 | ........... B60K/20/02 |
| DE | 197 35 441 C2 | 7/1999 | ........... B60R/25/04 |
| DE | 198 34 156 A1 | 2/2000 | ........... F16H/63/34 |
| DE | 10015782 A1 * | 1/2002 | ........... F16H/63/38 |
| EP | 0 103 533 A2 | 3/1984 | ........... B60R/25/04 |
| JP | 55140634 A * | 11/1980 | ............ B60T/7/12 |
| JP | 58110344 | 6/1983 | ............ B60T/7/12 |
| JP | 58110345 | 6/1983 | ............ B60T/7/12 |
| JP | 05246319 A * | 9/1993 | ........... B60T/13/66 |
| JP | 09315289 A * | 12/1997 | ........... B60T/13/40 |
| WO | WO 200006928 | * 2/2000 | |
| WO | WO 200010846 | * 3/2000 | |

Primary Examiner—Rodney H. Bonck
Assistant Examiner—David D. Le
(74) Attorney, Agent, or Firm—Davis & Bujold, P.L.L.C.

(57) ABSTRACT

The invention relates to a parking brake system for transmissions of motor vehicle, especially for an automatic transmission and an automated selector transmission, having one parking brake for blocking or releasing the transmission according to actuation signals of a control device, especially by a pawl engaging and disengaging in a parking brake gear connected with the output of the transmission, an electric operative connection between the control device in the interior of the motor vehicle and the parking brake, a spring accumulator (9) for actuating the parking brake and a pressure-controlled release device of the parking brake. It is proposed to load the release device (10) when releasing the parking brake with a negative pressure independent of the transmission and which is preferably taken from the suction system (15) of the internal combustion engine of the motor vehicle or from a negative pressure brake force booster of the motor vehicle.

12 Claims, 3 Drawing Sheets

U.S. PATENT DOCUMENTS

| | | | | |
|---|---|---|---|---|
| 3,842,950 A | * | 10/1974 | Fontaine | 188/170 |
| 3,944,286 A | * | 3/1976 | Engle et al. | 303/13 |
| 4,227,598 A | * | 10/1980 | Luft | 192/220.1 |
| 4,281,736 A | * | 8/1981 | Lizzio | 180/271 |
| 4,421,214 A | * | 12/1983 | Sellmeyer | 192/219.7 |
| 4,615,355 A | | 10/1986 | Garcia et al. | 137/383 |
| 5,203,616 A | * | 4/1993 | Johnson | 303/10 |
| 5,429,212 A | * | 7/1995 | Schlosser | 188/69 |
| 5,630,489 A | * | 5/1997 | Bebernes | 192/219.4 |
| 5,696,679 A | | 12/1997 | Marshall et al. | 364/424.082 |
| 5,794,739 A | * | 8/1998 | Ring et al. | 188/153 R |
| 6,386,338 B1 | * | 5/2002 | Powrozek | 188/156 |
| 6,471,027 B1 | * | 10/2002 | Gierer et al. | 192/219.5 |
| 6,481,556 B1 | * | 11/2002 | Haupt | 192/219.5 |
| 6,582,030 B2 | * | 6/2003 | Harris | 303/3 |

* cited by examiner

PARKING BRAKE SYSTEM FOR A GEARBOX OF A MOTOR VEHICLE

FIELD OF THE INVENTION

The invention relates to a parking brake system for an automatic transmission of a motor vehicle or an automated selector transmission of a motor vehicle.

BACKGROUND OF THE INVENTION

Automatic transmissions for motor vehicles usually have a mechanically operating parking brake device where, in parking position for example, a pawl detent engages in a toothing of a parking brake gear which is connected with the output of the transmission and thus with an axle of the vehicle. Mechanical and electrohydraulic systems are known as operative connections between parking brake and the control device thereof in the interior of the motor vehicle. Mechanical operative connections are constructed, for example, as Bowden cable, between the selector lever fixed to the body and the electrohydraulic transmission control disposed on the automatic transmission and the parking brake actuating device located in the transmission housing. A purely electric operative connection between the control device of the automatic transmission in the interior of the vehicle and the electrohydraulic transmission control implies a reaction of the electric signals to the parking brake actuating device in a mechanical movement of the detent pawl.

As an essential advantage of the purely electrically designed operative connection between the control device of the automatic transmission and the electrohydraulic transmission control, the site of the control device in the interior of the vehicle can be freely chosen. Another essential advantage is the acoustic uncoupling of the control device from the drive train of the motor vehicle.

DE 43 22 523 A1, for example, describes an electrohydraulic control device for an automatic transmission of a motor vehicle having one electrically constructed operative connection between the control device of the automatic transmission in the interior of the vehicle and the electrohydraulic transmission control in which the operating steps D, R and N are activated by pressurization of individual shifting members while the operating step P is activated by pressureless shift of all shifting members. This arrangement results in that the parking brake is activated upon drop of the pressure not only in all operating step P but in all operating steps of the selector lever. The parking brake is activated here via a spring accumulator; the deactivation of the parking brake is hydraulic. The pressure required for deactivation is made available via the oil pressure circuit of the automatic transmission. In order to be possible to unlock the activated parking brake in case of drop of the electric voltage supply, or defect of the electronic control unit of the automatic transmission, or defective supply of transmission oil, an emergency unlocking device is disclosed by means of which the parking brake can be mechanically unlocked.

DE 198 34 156.3 describes a parking brake system for an automatic transmission of a motor vehicle where the parking brake detent pawl is engaged as result of displacement by a spring accumulator and unlocked by hydraulic pressure made available via the oil pressure circuit of the automatic transmission under simultaneous prestress of the spring accumulator. To prevent an undesired engagement of the parking brake when the hydraulic pressure is cut off, there is provided a mechanical ball interlocking of the hydraulic actuating device of the parking brake. The ball interlocking is actuated, via an electromagnet, and kept in locking position so that the parking brake remains in unlocked position as long as the magnet is supplied with current.

The preamble of DE 41 27 991 C2 describes a parking brake system for an automatic transmission of a motor vehicle having an electrically constructed operative connection between the control device of the automatic transmission in the interior of the vehicle and the shiftable mechanism of the parking brake in which the parking brake is activated via a mechanical spring accumulator and deactivated via an electrohydraulic control device with control medium overpressure. For this purpose, the actuating rod with which the parking brake is brought to braking position and released from the braking position is designed at the same time as piston rod for an easily operating cylinder. To deactivate the parking brake and to keep the parking brake in the deactivated state, the cylinder is loaded with pressure oil via a solenoid valve. The hydraulic pressure for this is preferably supplied directly via the pressure oil circuit of the automatic transmission which also supplies the hydraulic transmission control with pressure oil. In the selector lever position P, the solenoid valve is in braking position and aerates the cylinder. In the pressureless state, the cylinder moves the parking brake to braking position by the spring of the spring accumulator. In one development is additionally proposed to provide an overpressure accumulator with shut-off valve in order to be able to hold the parking brake in deactivated state within a limited period of time while the engine is stationary and thus lacking pump pressure. Instead of the oil pressure supply, a pneumatic pressure supply can also be provided.

JP 58-110344 A has disclosed a parking brake system for a transmission where, in addition to a mechanical actuating device of a parking brake, there is provided an automatic, pneumatic actuating device of parking brakes. The parking brake is locked here via a spring accumulator acting upon a bolt which upon actuation of the parking brake engages in the toothing of a common gear of parking brakes. The additional pneumatic actuating device likewise acts upon the bolt and is controlled via a solenoid valve in accordance with driving conditions, the pneumatic energy being taken as negative pressure from a suction system of the prime mover. The additional pneumatic actuating device of the parking brake works, therefore, as automatic locking brake of the vehicle in the normal driving operation.

In the systems already described, it is disadvantageous that in case of failure of the pressure supply of the parking brake system, that is for example, when the engine stops or when the pressure circuit of the automatic transmission fails, the parking brake then actuated can no longer be released without a mechanical emergency unlocking device. If a mechanical emergency unlocking device of the parking brake is provided, which is accessible only from outside the interior of the vehicle, for example, in the engine space, and even if an acoustic coupling, such as by Bowen cable, from the transmission to the interior is prevented, the control thereof is rather circumstantial. Besides, the driver cannot immediately stop a vehicle inadvertently rolling back during actuation of the emergency unlocking device. A mechanical emergency unlocking device of the parking brake, accessible from the interior of the vehicle, in turn, has the known acoustic disadvantages of coupling of the bone connection of the transmission to the interior of the vehicle.

The problem on which the invention is based is to improve a parking brake system which has an electric operative connection between parking brake and control device thereof in the interior of the motor vehicle, as spring accumulator for activating the parking brake and an electrohydraulic or electropneumatic device for deactivating the parking brake, in the sense that a release of the parking brake when the prime mover of the motor vehicle is stationary and when the pressure supply of the transmission fails is possible without a mechanical emergency unlocking device of the parking brake.

This problem is solved according to the invention by a parking brake system having the features stated in the main claim. Other advantageous developments of the invention result from the sub-claims When the prime mover of the motor vehicle is stationary, the pressure oil pump usually connected with the engine shaft is also stationary. The pressure oil system of the transmission thus can deliver no direct energy via the oil pump for an active actuation of the release device of the parking brake. An overpressure accumulator integrated in the pressure circuit of an automatic transmission such as proposed in DE 41 27 991 C2, due to inner leakages determined by the system, will not be able already after a relatively short time to deliver enough actuating pressure. Other overpressure sources connected with the prime mover such a pneumatic compressor for pressurizing with compressed air automated gear selector systems or a high-pressure servo-pump of a braking power system thus cannot be used as energy sources for the release device of the parking brake. A passive actuation of the release device of the parking brake, for example, via an added spring accumulator which acts upon pressure failure, is critical for reasons of safety and can lead to undesired rolling back of the vehicle.

The use of electric energy stored in accumulators such as usually available in the motor vehicle for actuating the release device of the parking brake would in an emergency imply relatively great current intensities especially when the parking brake is braced, for example, when deactivating the parking brake on the slope. Besides, additional parts are needed, for example, actuating magnet or electric motor with reduction transmission.

SUMMARY OF THE INVENTION

According to the invention, it is now provided to actuate the release device of the parking brake by loading with negative pressure stored in the negative-pressure accumulator. In a specially advantageous manner, negative pressure systems with sufficient power reserves for unlocking a parking brake are available in practically all motor vehicles.

The negative pressure can easily be taken from the suction system of the driving internal combustion engine and be temporarily stored for actuation of the release device of the parking brake. This energy source is thus available for unlocking the parking brake even when the prime mover is stationary. Compared to an oil pressure accumulator technically attached to an existing hydraulic system of the transmission, there results the advantage of a longer time of pressure retention by elimination of the leakage specific to the hydraulics of the transmission.

In one development of the invention can also be provided that the negative pressure for actuating the release device of the parking brake is made available by an added aggregate of the engine that drives the transmission.

In another development of the invention, it is proposed to take the negative pressure from the braking system of the motor vehicle for actuating the release device of the parking brake. Braking systems assisted by negative pressure are widespread in the motor vehicle manufacture, especially in passenger cars and light commercial vehicles. It is thus possible in very many cases to reach back to a negative pressure accumulator already existing in the motor vehicle. The additional expense in the implementation of the inventive release device of the parking brake is accordingly advantageously low.

In one development of the invention, the release device of the parking brake actuated with the negative pressure can be provided in addition to an electrohydraulic or electropneumatic actuating device of the parking brake active in normal operation, that is, when the prime mover is working. In this case, the braking position of an activated parking brake under existing hydraulic or pneumatic overpressure can be released in a manner known per se by oil or air pressure. According to the invention, the parking brake is deactivated by negative pressure when the prime mover is stationary. The needed negative pressure is hereby advantageously limited to a very small range of operation of the vehicle, since a parking brake is actuated as a rule when the prime mover is working. Therefore, when the prime mover is working, no additional energy is removed therefrom and engine operations, such as the idling speed control and the operation of the vehicle brake, are not affected.

In other developments of the invention, it is proposed to control the negative-pressure actuated release device of the parking brake, via a solenoid valve, by the usually existing electronic control of the automatic transmission or automated selector transmission or by the control device thereof. There result here advantages in the control of the release device suited to the need particularly in relation to a parallel existence of negative-pressure actuated release device and electrohydraulic or electropneumatic actuating device of the parking brake.

In another design of the invention, it is proposed to construct the negative-pressure actuated release device of the parking brake so that the driver can manually release an additional electric emergency release device of the parking brake. The device is preferably designed as an electric switch which acts upon the solenoid valve that controls the release device. This electric switch can be advantageously situated in the interior of the vehicle like in the area of the control device of the transmission or can also be integrated in the control device. Hereby a simple and error-proof possibility of actuation is given to the driver, for example, in case of failure of engine and transmission. Contrary to a mechanical emergency unlocking device situated in the interior of the vehicle, all advantages of the acoustic uncoupling of transmission and vehicle are retained by virtue of the electric emergency unlocking device.

In another design of the invention, it is proposed to construct the negative-pressure actuated release device of the parking brake so that it is possible to actuate an additional electric emergency unlocking device of the parking brake by the electronic control of the prime mover. The device is preferably designed as electric control of the solenoid valve that controls the release device of the parking brake so that, in case of failure of the electronic transmission control, a still present actuation signal of the control device of the transmission is evaluated by the electronic engine control and a desired discontinuation of the parking position is reversed. It is hereby advantageously possible to increase the mobility of the vehicle in case of a corresponding failure, since in a purely electric operative connection between control device of the transmission and electronic transmission control, an activated parking brake usually can no longer be deactivated for unavailability of a driving position signal.

The spatial arrangement of the inventive actuation device of the parking brake is not limited to integration in the transmission housing but can also be placed outside the housing. The braking mechanism of the parking brake can also be located outside the transmission housing, for example, as component of an axle of the vehicle connected with the transmission output.

BRIEF DESCRIPTION OF THE DRAWING

The invention will now be described, by way of example, with reference to the accompanying drawings in which.

DETAILED DESCRIPTION OF THE INVENTION

Figure 1:
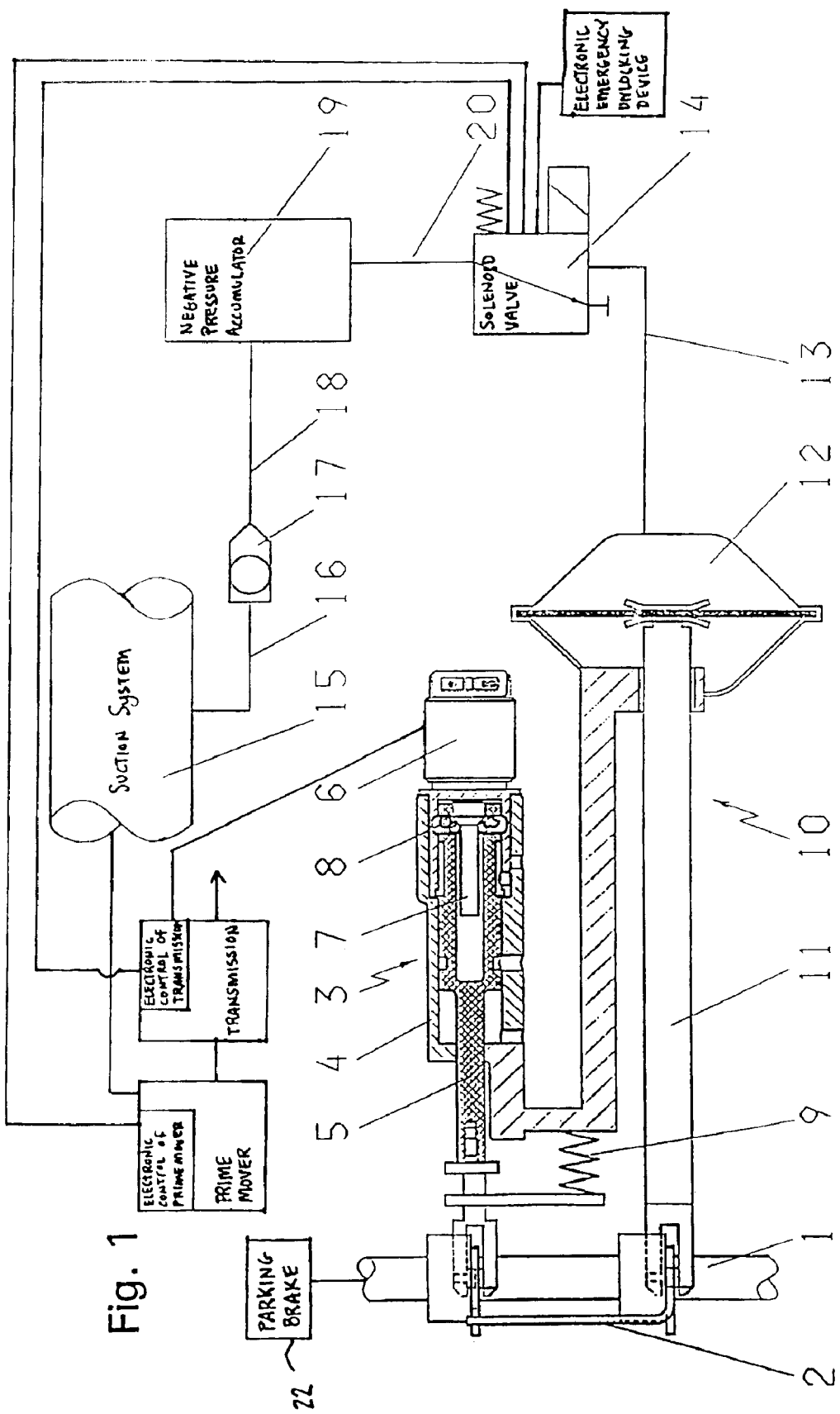
FIG. 1 shows parking brake with an actuating element of a braking device.

FIG. 1 shows an actuating element 1 of a braking device 21 of a parking brake 22. The braking device 21 can be designed, for example, as pawl detent situated in a housing 25 of an automatic transmission or automated selector transmission which, in braking position, engages in a parking brake gear connected with the output of the transmission thus blocking the transmission. In the actuating element 1 of the braking device, an electrohydraulic actuating device 3 and a negative-pressure actuatable release device 10 for the parking brake engage via a coupling device 2. The coupling device 2 is advantageously designed so that the actuating device 3 and the release device 10 can act independently of each other on the actuating element 1 of the braking device. In this manner the electrohydraulic actuating device 3, for example, can be designed in a manner known per se so that when hydraulic energy is available, that is, particularly when the prime mover of the transmission is working, it is controlled only for activating and deactivating the parking brake. The construction of the negative-pressure actuatable release device 10 can advantageously be simply designed here. One other advantage of this parallel arrangement of electrohydraulic actuating device 3 and negative-pressure actuatable release device 10 is the limitation of the deactivation of the parking brake to a few instances of use, via negative pressure, as already described above.

Instead of the electrohydraulic actuating device 3, an electropneumatic actuating device of the parking brake obviously can be provided. In another embodiment, the negative-pressure actuatable release device 10 can also be provided and exclusively assumes the function of deactivation of the parking brake.

FIG. 1 shows the electrohydraulic actuating device 3, given by way of example, in the position of the actuated parking brake. To deactivate the parking brake 22 in the presence of hydraulic pressure, a piston with piston rod 5 supported on a cylinder 4 is now hydraulically moved to a deactivating position. The pressurization takes place here, via an electrohydraulic control (not shown) of the transmission according to signals of a control device of the transmission 24. A spring accumulator 9 is prestressed simultaneously with the deactivation of the parking brake 22 which, in a manner known per se, controls an activation of the parking brake 22 during a pressureless shift of the actuating device 3. Due to a temporary pressure interruption in the hydraulic supply of the transmission, in a manner known per Se, a locking device 8 is provided to protect against undesired reactivation of the parking brake 22 which, in deactivated state of the parking brake 22 is brought to locking position by a current-supplied electromagnet 6, via an actuating device 7. The locking device 8 remains in locking position as long as the electromagnet 6 is supplied with current. The electromagnet is conveniently supplied with current by the transmission control on the basis of signals of the control device of the transmission, such as a selector lever, but can also be controlled directly via the control device and the electric power system of the motor vehicle.

FIG. 1 shows the inventive negative-pressure controlled release device 10 in the position of the activated parking brake. To deactivate the parking brake in the absence of hydraulic pressure, that is, when the actuating device 3 is not able to operate, the actuating element I of the braking device of the parking brake 22 is mechanically actuated by an actuating element 11. To this end, a negative-pressure cell 12, connected with the actuating element 11, is loaded with negative-pressure and thus the actuating element 11 is moved, to a deactivation position. Simultaneously with the negative-pressure controlled deactivation of the parking brake 22, the previously released spring accumulator 9 is again prestressed. It is thus ensured that when the negative pressure breaks down, the parking brake 22 is again engaged and the vehicle remains securely in its parking position.

According to the invention, the negative-pressure cell 12 is loaded with negative pressure via a line 13 and a solenoid valve 14. The negative pressure is taken from a suction system 15 (not shown in detail) of an internal combustion engine of the motor vehicle ordinarily used for propulsion and is led to the solenoid valve 14 via a negative-pressure line 16, a recoil valve 17, a negative-pressure line 18, a negative-pressure accumulator 19 and a negative-pressure line 20. In cooperation with the recoil valve (one way valve) 17, the negative-pressure accumulator 19 ensures that the inventive release device 10 of the parking brake is functionally available even when the internal combustion engine is stationary over a long period of time. It is advantageous here to coordinate the volume of the negative-pressure accumulator 19 with the power requirement of the release device 10 and dimension it sufficiency large. The inventive use of the suction pressure of the internal combustion engine as source of energy for deactivating the parking brake is of special advantage, since it is available in the prevalent part of all motor vehicles.

In another construction of the invention, it is proposed to take the negative pressure for actuating the release device 10 from the braking system. For example, the direct attachment of the negative-pressure line 20 to a braking force booster of negative pressure is especially advantageous, such as commonly used in motor vehicles, especially in most all passenger cars and light trucks, and already has an attachment to the suction system of the internal combustion engine, a recoil valve and a negative-pressure accumulator. Because of the reduced number of additional construction elements, there advantageously result for the inventive release device of the parking brake clear advantages in cost.

In another design of the invention, it can be provided to make available a negative pressure for actuating the release device 10, via a separate negative-pressure pump, which is operated electrically, for example. The dimensions of the negative-pressure pump can be advantageously optimized in direction to the pressure need of the release device 10 and the engagement being suited to need and thus sparing energy. With an adequate layout and arrangement of the negative-pressure pump, the recoil valve 17 and the pressure accumulator 19, or also only the pressure accumulator 19, can be eliminated each with the corresponding negative-pressure lines.

In one development of the invention can be provided to situate the solenoid valve 14 directly on the negative-pressure cell 12. Hereby the negative-pressure line 13 with its pressure terminals are advantageously eliminated. It is further possible with an arrangement of release device 10 and actuating device 3 inside the transmission or near the transmission to integrate the electric cable connection of the solenoid valve 14 in the already existing cable harness of the transmission. In another development of the invention can be provided that the solenoid valve 14 be situated directly on the pressure accumulator 19. Hereby the negative-pressure line 20 with its pressure connections are advantageously eliminated.

Therefore, by virtue of the invention the parking brake can, to a great extent, be unrestricted released by the driver in a way he knows even when the prime mover of the vehicle is stationary and the transmission control is normally operable. The acoustic uncoupling between the vehicle interior and the transmission is retained here by the electric operative connection between the control device and the release device 10 of the parking brake. In another development, instead of the solenoid valve 14, a pneumatically or hydraulically actuated valve can be provided, it being possible by additional constructional steps to ensure the acoustic uncoupling between the interior of the vehicle and the transmission.

In a further development of the negative-pressure control of the release device 10 of the parking brake, it is proposed to design the electric control of the solenoid valve 14 so that an electric emergency unlocking of the parking brake is possible. An advantageous development of this is the control of the solenoid valve 14 via the electronic control of the prime mover on the basis of signals of the control device of the transmission. When using a purely electric operative connection between the control device of the transmission and the hydraulics and mechanics of the transmission, the electric signals of the control device are also usually available for other control units of the vehicle such as via a CAN databus system.

One other advantageous development of the electric emergency unlocking is a switch or push-button in the interior of the vehicle for the current supply of the solenoid valve 14. The switch or push-button is preferably situated here in spatial proximity to the control device of the transmission or integrated in the control device.

By virtue of the electric emergency unlocking, the driver can deactivate the parking brake even in case of defective electronic transmission control, defective communication between control device of the transmission and electronic transmission control, or defective hydraulic supply of the transmission both when the prime mover is working and when stationary without acoustic disadvantages of the known mechanical devices for emergency unlocking of the parking brake which are accessible from the vehicle interior. Compared to the known mechanical devices for emergency unlocking of the parking brake, which are accessible only from outside the interior of the vehicle, clear facility of control results for the driver.

Figure 2:
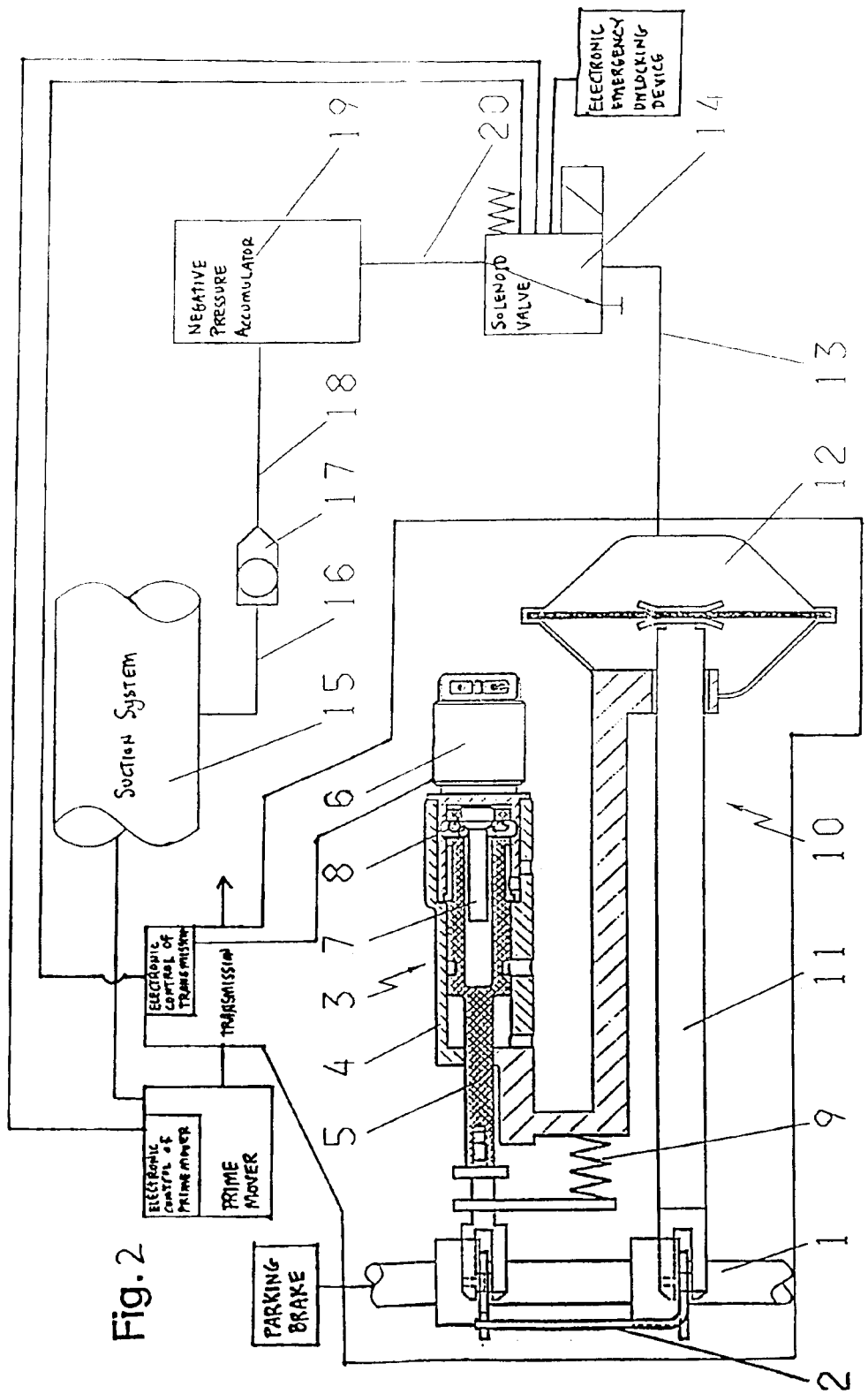
FIG. 2 shows a schematic view of one embodiment of the brake system.
Figure 2A:
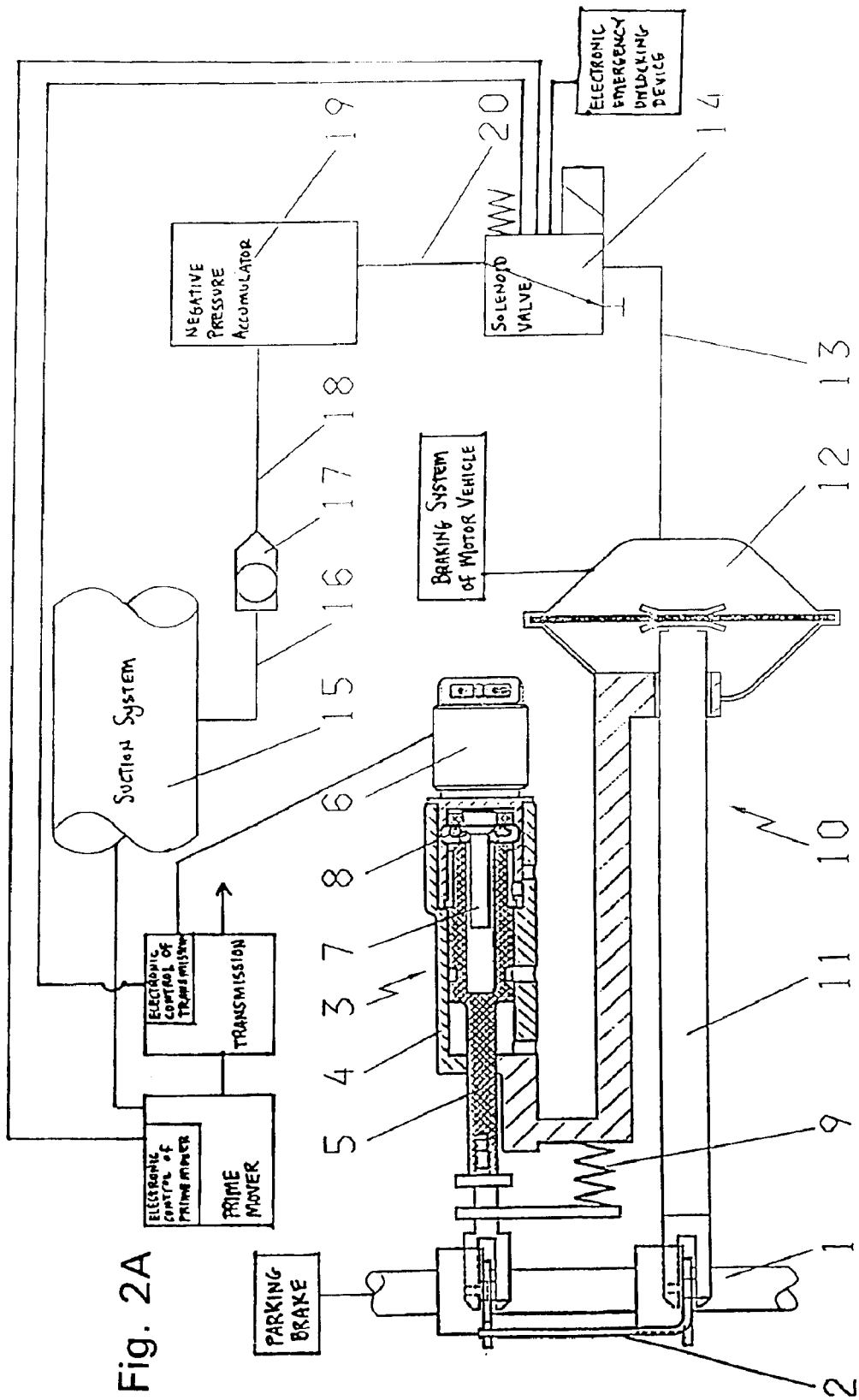
FIG. 2A shows a schematic view of a second embodiment of the brake system.

FIG. 2 is a schematic view of one embodiment of the parking brake system where the actuating device (3) and the release device (10) of the Parking brake are situated in a housing of the transmission. FIG. 2A is a schematic view of a second embodiment of the parking brake system with the parking brake, the actuating device (3) of the parking brake and the release device (10) of the parking brake are situated outside the transmission housing.

REFERENCE NUMERALS 1 actuating element of the braking device of the parking brake
2 coupling device
3 electrohydraulic actuating device for the parking brake
4 cylinder
5 piston with piston rod
6 electromagnet
7 actuating device of the locking device
8 locking device
9 spring accumulator
10 release device for the parking brake
11 actuating element of the release device
12 negative-pressure case
13 negative-pressure line
14 solenoid valve
15 suction system of the internal combustion engine
16 negative-pressure line
17 recoil valve
18 negative-pressure line
19 negative-pressure accumulator
20 negative-pressure line

What is claimed is:

1. A parking brake system for a transmission of a motor vehicle, the parking brake comprising:
a control device for controlling operation of the parking brake by an actuation signal;
an electric operative connection between the control device and the parking brake;
a spring accumulator (9) for activating the parking brake;
an electro-fluid actuating device (3) for releasing the parking brake; and
a release device (10) for releasing the parking brake, actuation of the release device being controlled by transmission-independent negative pressure and the parking brake being deactivatable by the actuating device (3) while at least one of a prime mover is operating and fluid pressure is supplied to the actuating device (3), and the parking brake being deactivatable by the release device (10), when the prime mover is stationary and no fluid pressure is available.

2. The parking brake system according to claim 1, wherein a braking system of the motor vehicle generates the negative pressure which is supplied to the parking brake system.

3. The parking brake system according to claim 1, wherein the release device (10) has a negative-pressure cell (12) and the negative-pressure cell (12) facilitates operation of the release device (10).

4. The parking brake system according to claim 1, wherein the release device (10) has a negative pressure accumulator (19).

5. The parking brake system according to claim 1, wherein, an electronic control of the transmission is part of the control device, a solenoid valve (14) controls operation of the release device (10) of the parking brake, and the solenoid valve (14) is controlled by the electronic control of the transmission.

6. The parking brake system according to claim 1, wherein the actuating device (3) and the release device (10) of the parking brake are situated in a housing (25) of the transmission.

7. The parking brake system according to claim 1, wherein the parking brake, the actuating device (3) of the parking brake and the release device (10) of the parking brake are situated outside the transmission housing (25).

8. The parking brake system according to claim 1, wherein the negative pressure is provided by one of the prime mover and an additional aggregate of the prime mover.

9. The parking brake system according to claim 8, wherein the prime mover has a suction system (15) which generates the negative pressure which is supplied to the parking brake system.

10. The parking brake system according to claim 1, wherein a solenoid valve (14) communicates with a negative pressure accumulator (19) for controlling actuation of the release device (10).

11. The parking brake system according to claim 10, wherein an electric emergency unlocking device controls the solenoid valve (14) which controls actuation of the release device (10).

12. The parking brake system according to claim 10, wherein an electronic control of the prime mover is part of the control device, an electric emergency unlocking device controls the release device (10) of the parking brake, and the solenoid valve (14) is controllable by the electronic control of the prime mover.

* * * * *